United States Patent [19]

Peters et al.

[11] 4,408,268

[45] Oct. 4, 1983

[54] PULSE MODULATED ELECTRONIC VOLTAGE CONTROLLER WITH SMOOTH VOLTAGE OUTPUT

[75] Inventors: Philip H. Peters, Greenwich; Abdallah M. Itani, Ballston Spa, both of N.Y.

[73] Assignee: General Electric Company, Schenectady, N.Y.

[21] Appl. No.: 406,651

[22] Filed: Aug. 9, 1982

[51] Int. Cl.³ .................... H02M 3/02; H02M 5/02
[52] U.S. Cl. .................... 363/62; 363/124; 363/163; 307/261; 318/811
[58] Field of Search .......... 307/261; 363/41, 62, 363/124, 159, 163; 318/811

[56] References Cited

U.S. PATENT DOCUMENTS 3,708,742  1/1973  Gunn ..................... 363/62
4,337,423  6/1982  Giordano ................. 318/280

Primary Examiner—William M. Shoop
Attorney, Agent, or Firm—Marvin Snyder; James C. Davis, Jr.

[57] ABSTRACT

Four switching elements are configured to reduce the voltage of either an alternating or a direct current electrical power source. The present circuit effectively operates like a variable autotransformer when used with a.c. input power. Additionally, when employed with a conventional resistive load, the present invention exhibits a power factor near unity.

5 Claims, 9 Drawing Figures

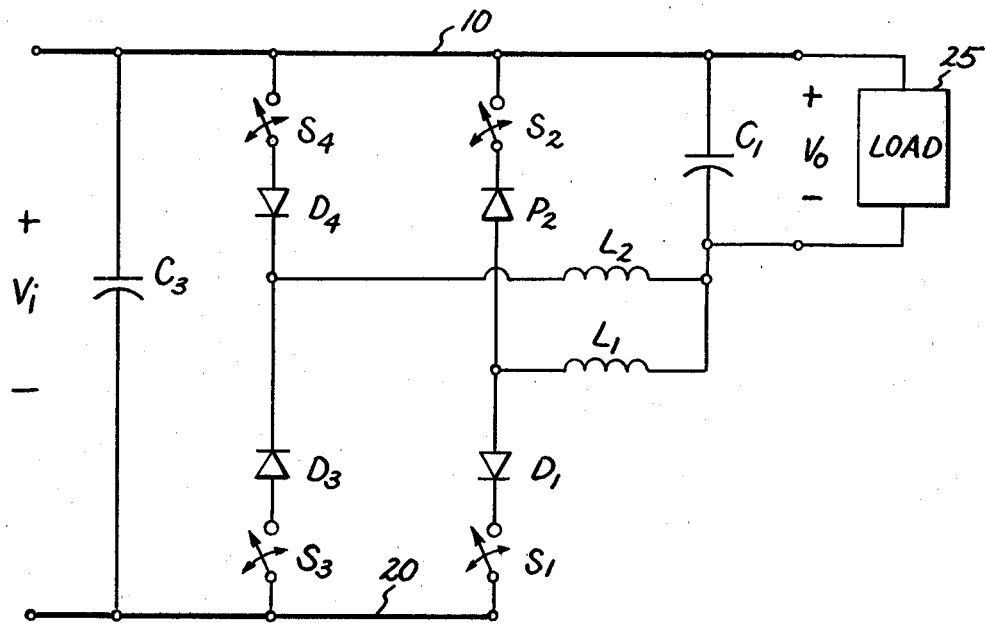
FIG. 2
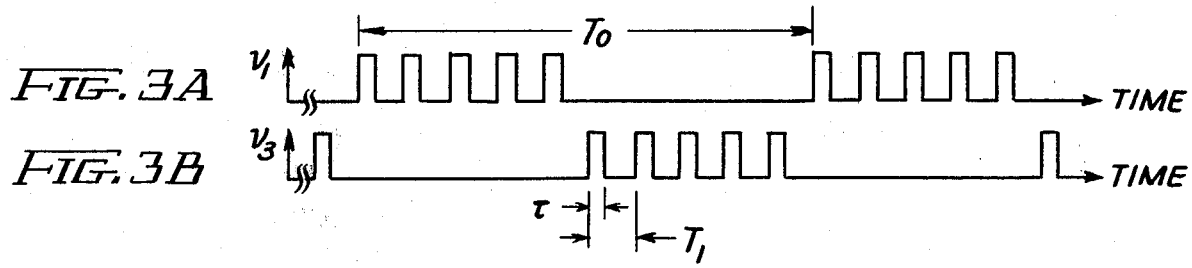
FIG. 3A
FIG. 3B
FIG. 4A
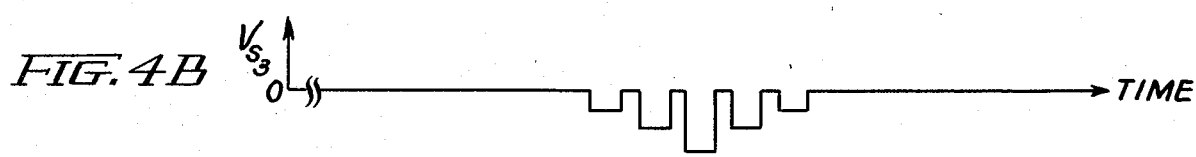
FIG. 4B
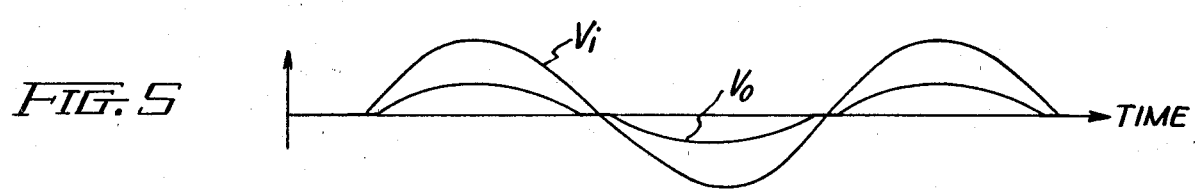
FIG. 5

PULSE MODULATED ELECTRONIC VOLTAGE CONTROLLER WITH SMOOTH VOLTAGE OUTPUT

BACKGROUND OF THE INVENTION

The present invention relates to power conditioning circuits and, in particular, to circuits accepting either an alternating or direct current input and producing a reduced voltage output.

There are many situations in which one would like to employ relatively low voltage devices. However, power is generally supplied at 110–120 volts or higher levels at frequencies of either 50 or 60 Hz. Many schemes exist for transforming this voltage to lower voltages which are useful in certain specific applications. One of the techniques employed for such voltage conversion is the use of step down transformers. However, transformers tend to be expensive, bulky, heavy and tend to exhibit the efficiency-diminishing effects of core loss. Other means for effectively reducing voltage include the use of such devices as silicon controlled rectifiers (SCRs). However, these devices can result in undesirably high levels of radiated electromagnetic noise, low power factor, and they often produce an output voltage waveform significantly different in form from the input waveform. In yet another scheme, an auxiliary capacitor is connected across a main capacitor in series with the load during a selected portion of the source waveform cycle to provide and control a low voltage across a resistive load. Such a scheme is described, for example, in U.S. patent application Ser. No. 379,393, filed on May 18, 1982, in the names of William P. Kornrumpf and Paul T. Cote, and assigned to the same assignee as the instant invention. However, that circuit exhibits a relatively low power factor and draws correspondingly high levels of current in certain applications. Accordingly, it is seen that it is desirable to be able to construct an alternating current voltage step down power conditioning circuit having the high power factor advantages of transformer circuits, without the necessity of employing bulky, heavy or costly transformer devices. The present invention fulfills these requirements and is additionally able to accept d.c. power input of either polarity and still function to produce an adjustable output voltage less than or substantially equal to the input voltage. The power conditioning circuit of the present invention is particularly useful in powering low voltage incandescent lamps. However, the circuit is equally applicable to other electrical devices including heaters and motor-driven appliances. Additionally, the circuit of the present invention not only provides a step down in the line voltage, but also provides a means for varying the output voltage and for such purposes as continuous lamp dimming at high power factor and with high power conversion efficiency.

SUMMARY OF THE INVENTION

In accordance with a preferred embodiment of the present invention, a power conditioning circuit for coupling an alternating or direct-current, two-wire electrical power source to a load comprises a common bus connecting one side of the load to the power source and a power bus connected to the other side of the power source. Capacitive means are preferably disposed in parallel across the load. A pair of inductive means are each connected between the side of the load which is not connected to the power source, and the power bus through separate main circuit switching means. The main circuit switching means operate to repeatedly disconnect the inductive means from the power bus. When the polarity of the power source is positive with respect to the power bus one of these circuit switching means is operative. During opposite polarity excursions of the power source, the other circuit switching means operates. Each of these main circuit switching means therefore operates when the other is idle, the period of operating being dependent upon the polarity of the power source with respect to the power bus. Furthermore, the present invention also comprises a pair of additional circuit switching means operating in conjunction with the main pair of circuit switching means to connect the power bus side of each inductive means to the common bus after the main switching means have operated to disconnect it from the power bus.

Using the switching scheme outlined above, the present invention converts an alternating or direct current input voltage to an adjustable output voltage substantially equal to or less than the input voltage. Control of the output voltage is made possible by varying the duty cycle of the switching means, for example, by controlling the pulse width of a square wave oscillator. The power conditioning circuit of the present invention is referred to herein as a "reductor". The reductor acts somewhat like a variable autotransformer, although without the necessity of electrical transformer devices. Furthermore, if the pulse width is properly modulated a square wave input can be converted to an approximately sinusoidal output. Smooth, wide range control of output voltage at supply frequencies as high as 25 KHz using pulse rates near 100 KHz are practical. The reductor may be designed for any input voltage permitted by the voltage and current ratings of the switching devices employed. Furthermore, the instant invention is also capable of operation under direct current power input conditions.

Accordingly, it is an object of the present invention to provide a power conditioning circuit capable of voltage reduction.

It is also an object of the present invention to provide a voltage reductor circuit in which the input and output waveforms are similar.

It is also an object of the present invention to provide a power conditioning circuit exhibiting a high power factor.

It is a further object of the present invention to provide a power conditioning circuit operating in a manner similar to that of a variable autotransformer.

Lastly, it is an object of the present invention to provide a power conditioning circuit useful in lamp dimming, heating control and other applications requiring variable power supply to a load.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 is a schematic diagram similar to FIG. 1, more particularly illustrating switching elements and their associated flow-reversal prevention diodes;

FIG. 3A is a plot of voltage versus time for the control voltage for switch $S_1$;

FIG. 3B is a plot of voltage versus time for the control voltage of switch $S_3$;

FIG. 4A is a plot of voltage versus time for the voltage across switch $S_1$ under sinusoidal power input conditions;

FIG. 4B is a plot of voltage versus time for the voltage across switch $S_3$ under sinusoidal power input conditions;

FIG. 5 is a plot of voltage as a function of time particularly illustrating the relationship between the input and output voltage under sinusoidal input conditions;

DETAILED DESCRIPTION OF THE INVENTION

Figure 1:
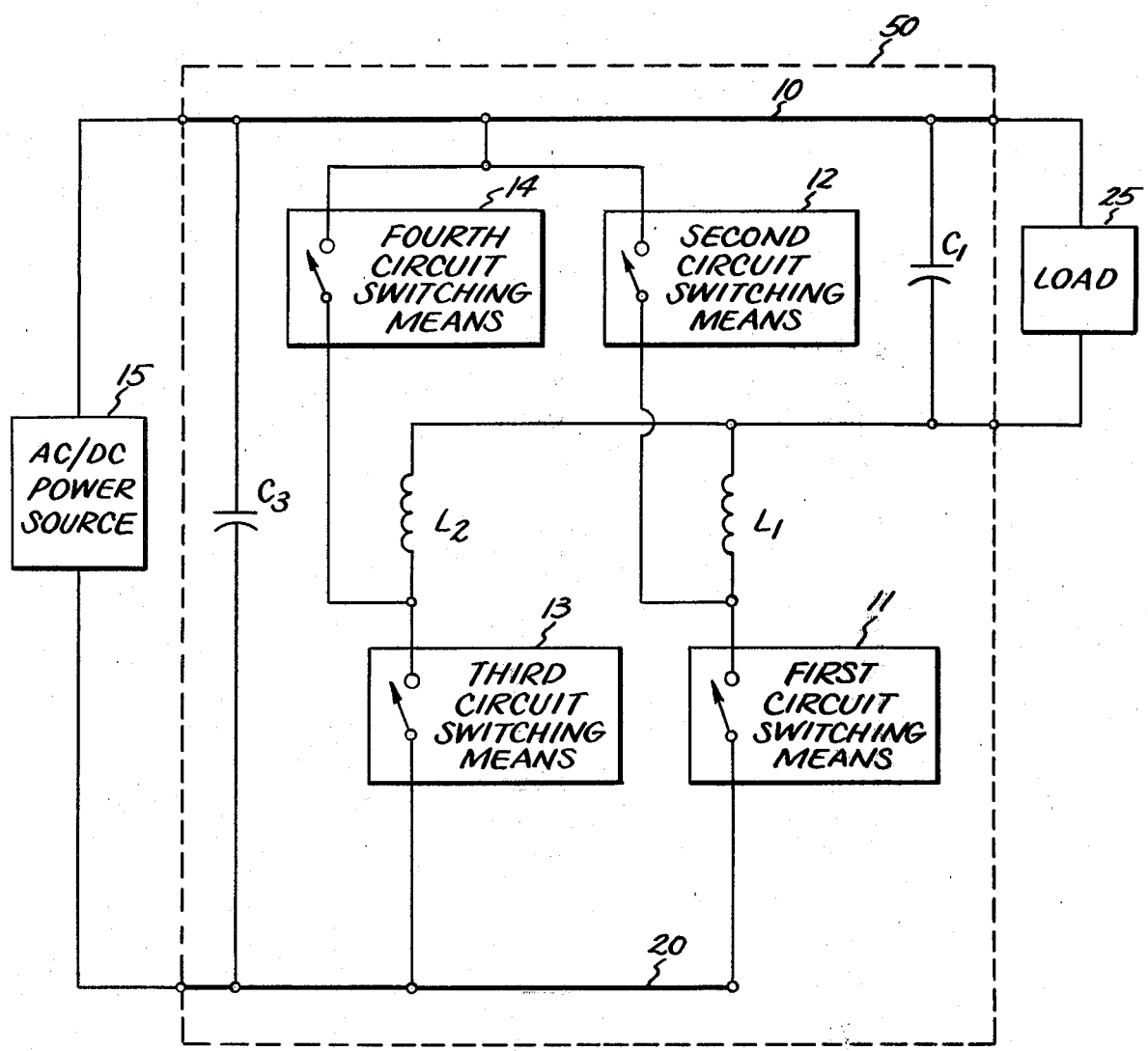
FIG. 1 is a schematic diagram illustrating a generic embodiment of the present invention.

FIG. 1 illustrates a generic embodiment of the present invention. Other, specific embodiments are more particularly illustrated in FIGS. 2 and 6, discussed further below. The power conditioning circuit, or reductor, 50 of the present invention is electrically disposed between two-wire power source 15 and load 25. Power source 15 may be a source of either alternating current or direct current electrical energy. For a smooth output waveform and a wide range of output voltage control, frequency at which the circuit switching means operate should preferably be at least four times the source frequency. Reductor 50 comprises common bus 10 and power bus 20. Common bus 10 connects a first, or high side of power source 15 to a first side of load 25. Power bus 20 is connected to the other side of power source 15. Capacitive means $C_1$ is disposed so as to be connected in parallel across load 25. Reductor 50 also comprises inductive means $L_1$ having a first side thereof connected to the side of load 25 which is not directly connected to common bus 10. Whenever power source 15 exhibits a first voltage polarity with respect to power bus 20, first circuit switching means 11 and second circuit switching means 12 operate in a basically complementary fashion to alternately connect and disconnect the second side of inductive means $L_1$ to power bus 20 and to common bus 10. In a similar way, inductive means $L_2$, together with third circuit switching means 13 and fourth circuit switching means 14 operate in a similar fashion to aternately connect the second side of $L_2$ to power bus 20 to common bus 10; however, this latter switching action only occurs during those time intervals in which power source 15 exhibits a second voltage polarity with respect to power bus 20. Thus, in the present invention, in normal operation, either inductive means $L_1$ is being alternately connected to power bus 20 and common bus 10, with inductive means $L_2$ being fully disconnected, or inductive means $L_2$ is being alternately connected to power bus 20 and common bus 10, with inductive means $L_1$ being totally disconnected. The length of time that either $L_1$ or $L_2$ is connected to power bus 20 is referred to as $\tau$. The periodicity with which this connection is made is defined as the time interval $T_1$. Therefore, the period of time during which either $L_1$ or $L_2$ is connected to common bus 10 is at most $T_1 - \tau$. In accordance with the usual conventions, the ratio $\tau/T_1$ is defined as the duty cycle and it is the control of this duty cycle which determines the peak voltage supplied to load 25. Additionally, reductor 50 also preferably includes input capacitor $C_3$ which operates to prevent pulse currents from passing to power source 15.

FIG. 2 illustrates another embodiment of the present invention in which circuit switching means 11, 12, 13 and 14 are embodied in series combination with diodes $D_1$, $D_2$, $D_3$ and $D_4$ and switches $S_1$, $S_2$, $S_3$ and $S_4$, respectively, as shown. The reductor circuit of FIG. 2 supplies output voltage $V_o$ having a waveshape similar to that of the input voltage $V_i$, but with an electronically controllable amplitude which may be made substantially equal to or less than that of the input voltage $V_i$. The reductor circuit shown includes two switches $S_1$ and $S_3$ which conduct current in opposite directions and which are rapidly switched on and off at a rate at least several times that of the frequency of the input supply. $S_1$ is turned on and off only when the supply voltage is of positive polarity and $S_3$ is turned on and off only when the supply voltage is of negative polarity. Reverse conduction through $S_1$ and $S_3$ is prevented by diodes $D_1$ and $D_3$, respectively.

For positive input voltage $V_i$, current passes first through smoothing capacitor $C_1$ and parallel load 25. It then flows through inductor $L_1$, diode $D_1$ and $S_1$ and back to the supply by means of power bus 20. For negative values of input voltage $V_i$, current passes through $S_3$, $D_3$, $L_2$ and the parallel combination of $C_1$ and load 25, in the opposite direction. Under sinusoidal input conditions, the switching action of switches $S_1$ and $S_3$ is controlled by means of pulse signals having the time relationships indicated in FIGS. 3A and 3B. In particular, it is indicated therein that switch $S_1$ is repeatedly closed and opened over a period of time equal to approximately $T_0/2$ and that during the second half of the $T_0$ time period, switch $S_3$ is alternately switched on and off. $T_0$ is the period of the sinusoidal input voltage $V_i$. For a sinusoidal input of sufficiently low frequency $(1/T_0)$, the pulse modulation of switch $S_1$ results in a modulated voltage $V_{S1}$ across $S_1$ such as that shown in FIG. 4A. The voltage across switch $S_3$, namely, $V_{S3}$, is identical except that it is of negative polarity and shifted in time by one-half of an input cycle as shown in FIG. 4B. The voltage across either switch and its companion diode is simply the difference between the input voltage and the voltage across the respective inductive means and load. During each pulse, capacitor $C_1$ is charged through inductor $L_1$ or $L_2$ in proportion to the length of the pulse, $\tau$. The level of the output voltage $V_0$ is governed by the ratio $\tau/T_1$ where, as above, $T_1$ is the period associated with the pulse repetition rate. The voltage across capacitor $C_1$ varies with the input voltage and reverses polarity when the input voltage polarity is reversed. Inductive means $L_1$ and $L_2$ limit the current delivered to the load during each pulse. At the end of a pulse, either $S_1$ or $S_3$ (depending on power source polarity) is turned off and energy stored in one or the other inductor is transferred to the load through common bus 10, to obtain high circuit efficiency. If this energy were not to be transferred it would generate a high and excessive flyback voltage across the switch which has just been turned off and would be dissipated in the switch. However, this is not a desirable condition and, accordingly, second and fourth circuit switching means 12 and 14, respectively, are provided to prevent this problem. During the operative portion of the cycle for switch $S_1$, switch $S_2$ is closed as switch $S_1$ is opened. Switches $S_2$ and $S_4$ and corresponding isolating diodes $D_2$ and $D_4$, respectively, carry currents which transfer energy stored in $L_1$ or $L_2$, respectively, to capacitor $C_1$ at the end of each pulse during their respective cycles. As a result, the peak voltage across either $S_1$ or $S_3$ is limited to the value of the input voltage existing at the moment a given modulating pulse of FIG. 3 is turned off. This value is governed by the duty cycle $\tau/T_1$ which is increased to increase the maximum amplitude of the output wave and decreased to reduce the maximum amplitude of the output voltage $V_o$ appearing across load 25. Representative curves indicating the relationship between input and output voltage signals for a sinusoidal input voltage are shown in FIG. 5. In this situation, $T_0$, which is effectively the period associated with the signal from power source 15, is larger than the pulse repetition frequency $1/T_1$. In general, $T_0$ is at least four times, and preferably at least 10 times, greater than $T_1$. The larger the ratio $T_0/T_1$, the more accurately the input waveform is tracked. However, the value $\tau/T_1$ provides a scaling factor which cannot exceed 1.

Figure 6:
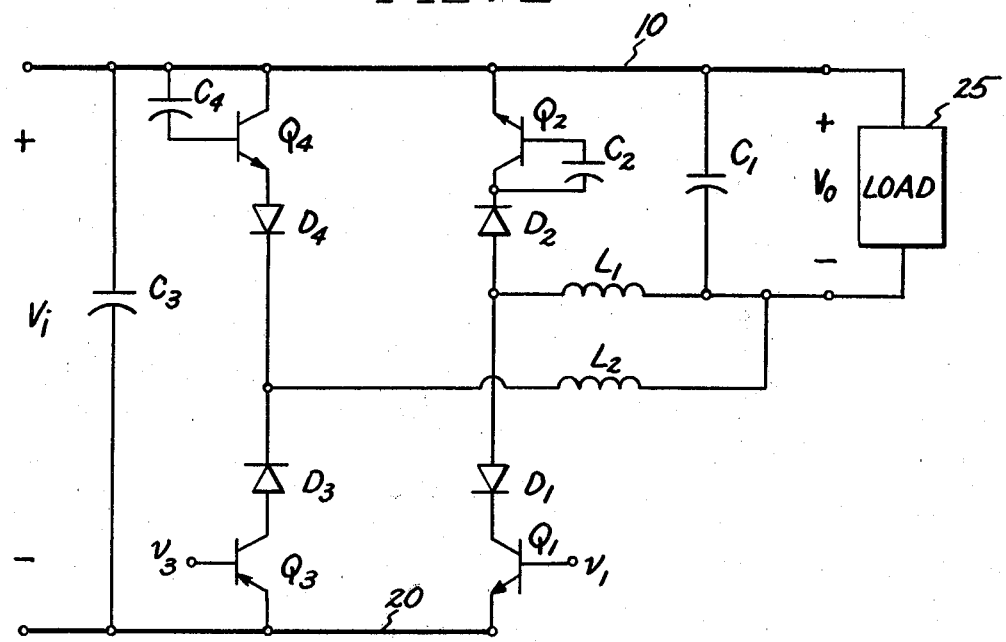
FIG. 6 is a schematic diagram of the reductor circuit of the present invention more particularly illustrating the use of semiconductor switching elements in a preferred embodiment.

FIG. 6 shows a working reductor circuit employing bipolar transistor switches $Q_1$, $Q_2$, $Q_3$ and $Q_4$ in place of the correspondingly numbered switches shown schematically in FIG. 2. As shown in FIG. 6, pulsed base drive voltage $V_1$ is applied to the base of $Q_1$ only during alternate positive half cycles of the input voltage $V_i$. Output symmetry is maintained if the base drive voltages $V_1$ and $V_3$ are symmetric and the input voltage is symmetric. When the power source voltage is positive, $Q_2$ is turned on at the moment $Q_1$ is turned off by the immediate reversal of the voltage across $L_1$ which falls due to a rapid decrease in the rate of change of current through $L_1$. The turn-on of $Q_1$ is automatically accomplished with the aid of small shunting capacitor $C_2$. Capacitor $C_2$ is connected between the collector and base of $Q_2$ to increase the effective capacitance between emitter and base so as to hold $Q_2$ on as long as pulses are applied rapidly to $Q_1$. A similar boot strap triggering of $Q_4$ is accomplished with collector-to-base capacitor $C_4$ when the input voltage is of negative polarity. The reactance of shunting capacitors $C_4$ and $C_2$, at the input frequency of $V_i$, is made high so that either $Q_2$ or $Q_4$ are in an off state when their respective companion transistors $Q_3$ and $Q_1$ are not being pulsed. For example, with $Q_4$ off during the positive half cycle, $D_4$ cannot conduct, and the output voltage is not shorted by the path through $Q_4$ and $D_4$. Additionally, it should be noted that $Q_2$ and $Q_4$ may comprise SCRs and that $C_2$ and $C_4$ could be used to trigger the gates of the SCRs. Of course, switches $Q_1$ and $Q_2$ could be driven by separate control signals derived from voltages $V_1$ and $V_3$, for example.

Alternatively, the pulse signals applied to $Q_1$ may be transformed to the voltage levels of $Q_2$, rectified by a diode and integrated by a capacitor to hold $Q_2$ in the "on" state throughout the positive half of the input voltage cycle. Diode $D_2$ is then reverse connected and commutates inductive energy to $C_1$ during the positive half cycle of the input voltage. On the negative half cycle, $Q_4$ is held in a conductive state throughout a half cycle of the input voltage in a similar way. The pulse power to hold $Q_2$ or $Q_4$ in the "on" state may also be obtained from a secondary winding on the core of $L_1$ or $L_2$, respectively. Such circuits avoid the need to supply square wave base signals to the bases of switches $Q_2$ and $Q_4$ at the comparatively low frequency of the input voltage.

A particular advantage of the present circuit is that transistor switches $Q_2$ and $Q_4$ are actuated by the production of reverse voltage cross corresponding inductors $L_1$ and $L_2$, respectively. Diodes $D_2$ and $D_4$ assure a flow of reverse current through $L_1$ or $L_2$, respectively, only during those times at which $Q_1$ and $Q_3$, respectively, are turned off, thus permitting stored energy in the inductors to be supplied to the load by means of a current flowing in the proper direction.

Pulse currents are prevented from passing to the load by input capacitor $C_3$. Both $C_1$ and $C_3$ are selected to have a relatively small capacitance since they act only to bypass higher frequencies rather than alternating current frequencies appearing in the input power source. The pulse modulation rate is chosen to be any frequency up to about 100 KHz. Operation at high frequency reduces the size, weight and cost of the passive components. For high conversion efficiencies, the use of devices with short switching times, such as power MOS devices, are preferably used for $Q_1$ and $Q_3$ to achieve high switching rates with minimum drive power.

It should be understood that smoothing capacitor $C_1$ is generally preferred in the present invention, but is not always required, the choice being dependent upon the nature of the load at the particular application involved. For example, some loads may already exhibit an impedance having a capacitive reactance component. If this capacitive reactance component is sufficiently large, then it may no longer be necessary to include a separate capacitor $C_1$ for output voltage waveform smoothing. In still other applications, such as in the control of devices such as electrical resistance heaters, it is not necessary to provide a smoothed voltage waveform to such a load. Accordingly, in such cases, the voltage output exhibits a pulsed-shaped waveform similar to those shown in FIGS. 4A and 4B.

Figure 7:
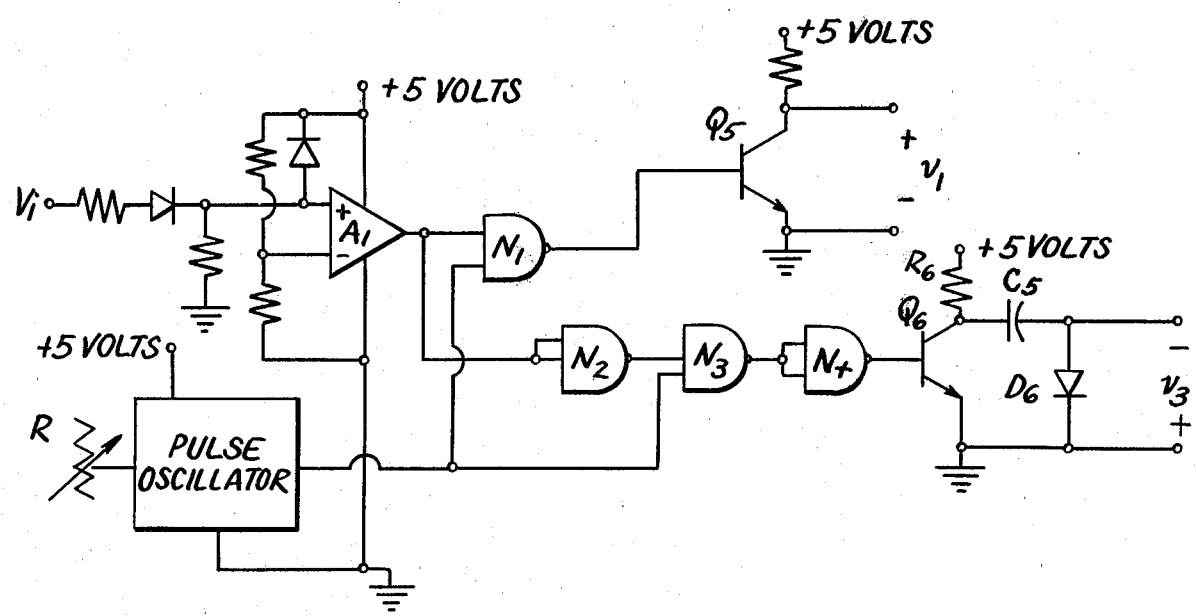
FIG. 7 is a schematic diagram of a logic circuit for providing control voltage signals to transistors $Q_1$ and $Q_3$.

FIG. 7 shows one embodiment of a logic circuit which may be provided for producing the base drive pulses, $v_1$ and $v_3$ for operating the reductor of FIG. 6. It is noted herein that the ground symbols shown in FIG. 7 are included to indicate a circuit common, not a circuit or earth ground nor a connection with common bus 10. The circuit of FIG. 7 possesses two outputs, one for $Q_3$ for negative input polarity voltages and one for $Q_1$ for positive input polarity voltages. Operational amplifier $A_1$ produces a positive 5 volt output for positive input to the reductor and zero output voltage for negative polarity input to the reductor. Recurrent pulses from the pulse oscillator are directed to one or the other output circuit by combining them with the operational amplifier output or its inverse in nand gates $N_1$ and $N_3$. The output of nand gate $N_1$ controls drive transistor $Q_5$ which is used to provide pulse control voltage $v_1$ for $Q_1$. The output of nand gate $N_4$ controls drive transistor $Q_6$ from which the drive voltage $v_3$ for transistor $Q_3$ is derived. Nand gates $N_2$ and $N_4$ are connected so as to serve as inverting circuits. The circuits are connected as shown, essentially accepting information signals from the output of operational amplifier $A_1$ and the variable pulse oscillator. No pulses are applied to $Q_3$ when input polarity is positive, or to $Q_1$ when it is negative. Since it is necessary to provide a negative-going pulse to operate PNP transistor $Q_3$, special output circuitry is connected to the oscillator of $Q_6$. In particular, series capacitor $C_5$ is discharged into the base emitter junction of power transistor $Q_3$ when transistor $Q_6$ is turned on. Capacitor $C_5$ is charged by the pull-up resistor $R_6$ and diode $D_6$ at the output of $Q_6$.

In one reductor circuit of the present invention, tests were conducted at switching rates in the range from about 30 to about 120 KHz. The capacitances $C_2$ and $C_4$ were both selected to be 0.01 microfarads. Capacitors $C_1$ and $C_3$ were both selected to have capacitances of 1 microfarad. Inductances of 150 microhenries were used both for $L_1$ and $L_2$.

It should also be noted that when the load is removed while the transistors are being switched, the output voltage across $C_1$ rises to the level of the input voltage and the input power drops to zero. This is a highly desirable feature for a circuit of this type.

While the apparatus of the present invention is capable of being energized by a direct current power source of either polarity, the control circuit components as shown in FIG. 7 will typically determine a preferential d.c. input voltage polarity. For example, if the negative source voltage terminal is connected to power bus 20, the result if that the circuit common node shown in FIG. 7 should also be connected to power bus 20 for proper operation. A separate power supply (not shown) provides the +5 volt power signal for driving the control circuit, in any event. Similarly, depending on specific application requirements, it is generally desirable that power bus 10 be connected to a circuit or earth ground if grounding is needed or desired.

It should also be pointed out that, as used herein and in the appended claims, the term "bus" is not meant to convey any special meaning other than that of a common electrical circuit node, wire or similar electrical current lead. It should also be noted that while certain devices herein are described as being switched on and off, that such terms in the electrical arts typically refer to relative resistance values and are not necessarily meant to imply a mechanical contact separation. However, switches $S_1$, $S_2$, $S_3$ and $S_4$ shown in FIG. 2 could, under certain circumstances, preferably comprise mechanically-actuated switching devices. However, it is generally, but not exclusively, contemplated that such switches are, in fact, semiconductor devices such as field effect transistors (FETs) or bipolar junction transistors (BJTs).

From the above, it may be appreciated that the reductor circuit of the present invention provides an efficient and economical means for the voltage reduction of both alternating current and direct current power sources. It is further seen that the reductor circuit of the present invention exhibits a high power factor and provides a facile means for varying the output voltage over a relatively wide range of values. It is further seen that the circuit of the instant invention operates in a manner similar to that of a variable autotransformer without the necessity of providing the relatively bulky transformer generally required for such voltage reduction. Furthermore, it is seen that for sinusoidal input voltages, substantially sinusoidal output voltages of the same frequency result.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A power conditioning circuit for coupling an alternating or direct current, two-wire, electrical power source to a load, said circuit comprising:
   a common bus connected to a first side of said power source and to a first side of said load;
   a power bus connected to the second side of said power source;
   first inductive means having a first side connected to the second side of said load;
   first circuit switching means connected between the second side of said first inductive means and said power bus, said first circuit switching means operating to repeatedly disconnect said first inductive means from said power bus, whenever said power source exhibits a first voltage polarity with respect to said power bus;
   second circuit switching means connected between the second side of said first inductive means and said common bus, said second circuit switching means operating to connect said first inductive means in parallel with said load whenever said first conductive switching means operates to disconnect said first inductive means from said power bus;
   second inductive means having a first side connected to the second side of said load;
   third circuit switching means connected between the second side of said second inductive means and said power bus, said third circuit switching means operating to repeatedly disconnect said second inductive means from said circuit power bus whenever said power source exhibits a voltage polarity opposite said first voltage polarity, with respect to said power bus; and
   fourth circuit switching means connected between the second side of said second inductive means and said common bus, said fourth circuit switching means operating to connect said second inductive means in parallel with said load whenever said third circuit switching means operates to disconnect said second inductive means from said power bus.

2. The power conditioning circuit of claim 1 further including a first capacitive means connected in parallel with said load.

3. The power conditioning circuit of claim 1 further including a second capacitive means connected between said power bus and said common bus.

4. The power conditioning circuit of claim 1 in which said repeated disconnections occur at a frequency greater than the frequency of said alternating current power source.

5. The power conditioning circuit of claim 1 further incuding means for grounding said power bus.

* * * * *